(12) United States Patent
Burgener et al.

(10) Patent No.: US 10,106,273 B2
(45) Date of Patent: Oct. 23, 2018

(54) IN-FLIGHT TRANSFER OF REACTANT FROM A TOWING OR CARRYING AIRPLANE TO AN ATTACHED ROCKET OR ROCKETPLANE

(71) Applicants: John A. Burgener, Mississauga (CA); Mitchell Burnside Clapp, Arlington, VA (US); Daniel Lee DeLong, Midland, TX (US)

(72) Inventors: John A. Burgener, Mississauga (CA); Mitchell Burnside Clapp, Arlington, VA (US); Daniel Lee DeLong, Midland, TX (US)

( * ) Notice: Subject to any disclaimer, the term of this patent is extended or adjusted under 35 U.S.C. 154(b) by 0 days.

(21) Appl. No.: 15/468,878

(22) Filed: Mar. 24, 2017

(65) Prior Publication Data

US 2018/0265211 A1    Sep. 20, 2018

Related U.S. Application Data

(63) Continuation of application No. 15/460,904, filed on Mar. 16, 2017.

(51) Int. Cl.
| | | |
|---|---|---|
| *B64G 1/14* | (2006.01) | |
| *B64D 39/00* | (2006.01) | |
| *B64G 1/40* | (2006.01) | |
| *B64D 5/00* | (2006.01) | |
| *B64C 39/02* | (2006.01) | |
| *B64G 1/00* | (2006.01) | |
| *B64D 27/02* | (2006.01) | |

(52) U.S. Cl.
CPC ............ *B64D 39/00* (2013.01); *B64C 39/024* (2013.01); *B64D 5/00* (2013.01); *B64D 27/023* (2013.01); *B64G 1/005* (2013.01); *B64G 1/14* (2013.01); *B64C 2201/141* (2013.01); *B64C 2201/146* (2013.01)

(58) Field of Classification Search
CPC . B64D 39/00; B64D 5/00; B64D 3/00; B64D 27/023; B64C 37/02; B64G 1/005; B64G 1/14; B64G 1/40; B64G 1/401; B64G 1/402
See application file for complete search history.

(56) References Cited

U.S. PATENT DOCUMENTS

| | | | | |
|---|---|---|---|---|
| 2,388,013 | A * | 10/1945 | Rasor | ............... B64D 39/00 244/135 A |
| 5,295,642 | A | 3/1994 | Palmer | |
| 5,456,424 | A | 10/1995 | Palmer | |
| 5,564,648 | A | 10/1996 | Palmer | |
| 5,626,310 | A | 5/1997 | Kelly | |

(Continued)

*Primary Examiner* — Richard R Green
(74) *Attorney, Agent, or Firm* — Lathrop Gage LLP

(57) ABSTRACT

A high altitude vehicle is brought to a desired altitude above sea-level prior to the transfer of fuel and/or oxidant from an airplane to the high altitude vehicle. The high altitude vehicle may be towed to the desired altitude by a tow airplane or may reach the desired altitude under its own power. At the desired altitude, the high altitude vehicle is connected to the tow airplane via a tow cable. Alternatively, the high altitude vehicle may be mechanically carried by the tow airplane. Fuel and/or oxidant is transferred to the high altitude vehicle from the tow airplane via respective fuel and/or oxidant lines. The high altitude vehicle then separates from the tow airplane and proceeds to high altitude under its own power.

10 Claims, 2 Drawing Sheets

(56) References Cited

U.S. PATENT DOCUMENTS

| | | |
|---|---|---|
| 5,667,167 A | 9/1997 | Kistler |
| 5,842,665 A | 12/1998 | McKinney et al. |
| 5,927,653 A | 7/1999 | Mueller et al. |
| 6,029,928 A | 2/2000 | Kelly |
| 6,119,985 A | 9/2000 | Clapp et al. |
| 6,158,693 A | 12/2000 | Mueller et al. |
| 6,612,522 B1 | 9/2003 | Aldrin et al. |
| 7,523,892 B2 * | 4/2009 | Cook .................... B64G 1/005 244/158.5 |
| 2009/0173830 A1 | 7/2009 | Cormier |
| 2016/0039521 A1 | 2/2016 | London et al. |

* cited by examiner

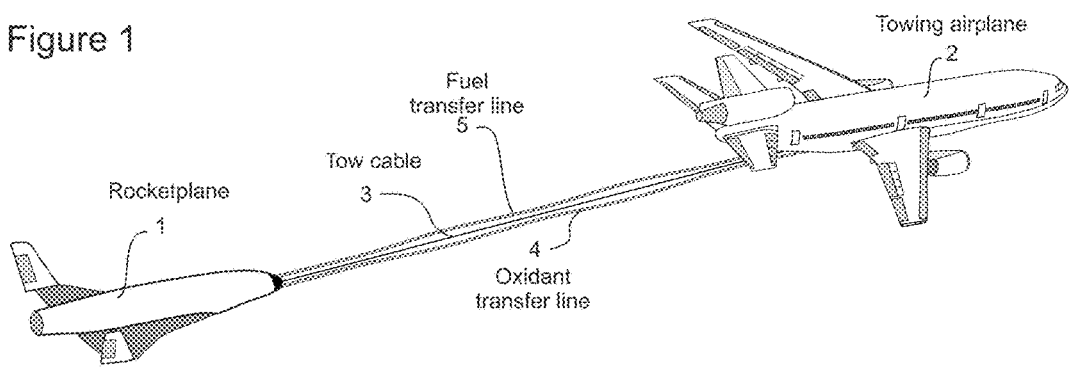
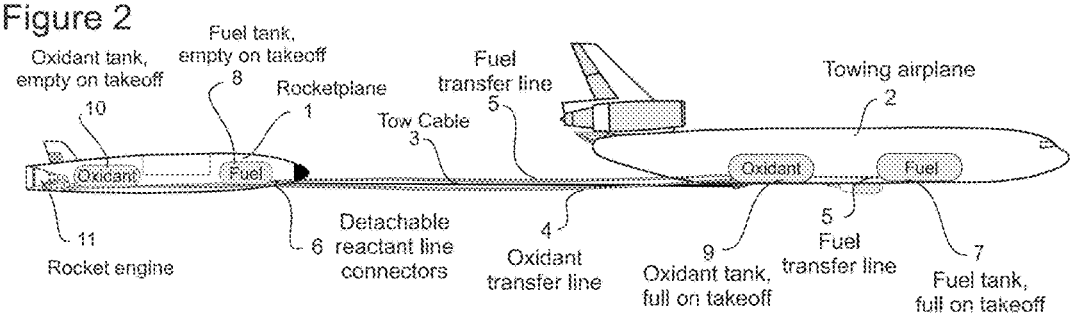
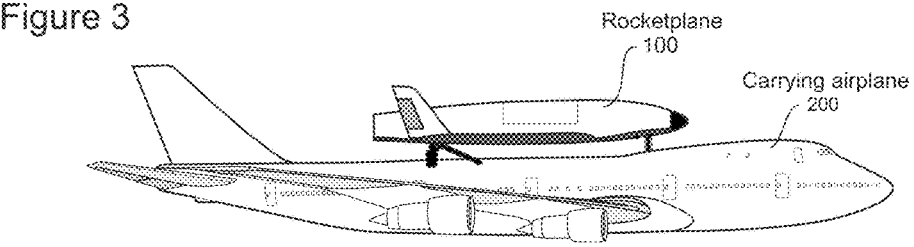
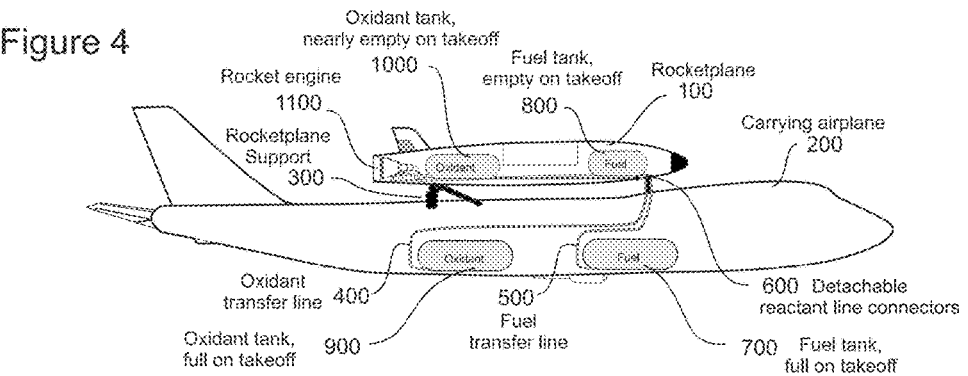

IN-FLIGHT TRANSFER OF REACTANT FROM A TOWING OR CARRYING AIRPLANE TO AN ATTACHED ROCKET OR ROCKETPLANE

STATEMENT REGARDING FEDERALLY SPONSORED RESEARCH OR DEVELOPMENT n/a

BACKGROUND OF THE INVENTION

Disclosed are concepts related to rockets used to launch payload such as satellites into orbit. Re-usable rockets would dramatically reduce the cost of launch services. Starting a launch while at higher altitudes enhances the performance of the rocket engines, and if traveling at airplane cruising speed, the cruising speed is added to the rocket's final velocity, improving its payload size and weight capabilities or increasing its final speed and altitude. Various methods have been proposed to assist a rocket to allow it to start powered flight at altitude.

Satellites have become a necessary part of life in the last 50 years. We use GPS to navigate our cars, airplanes and ships. We use satellites for internet, radio, TV and cell phones. Government satellites monitor the weather, climate and activities on Earth. Google Earth allows us to see the entire planet from satellite views, with higher resolution each year. Also payloads such as supplies to the International Space Station are necessary on a regular basis. To keep so many satellites in orbit, and to constantly add new ones, many rockets are launched each year. It would be less expensive and easier to design rockets that can launch from Earth, fly to orbit, deliver a payload to orbit, return to Earth and be ready to launch again the next day. Such a rocket would be classed as a reusable single stage to orbit rocket. Some patents have been issued for single stage to orbit designs, such as U.S. Pat. Nos. 5,667,167 and 5,842,665. However at present no single stage to orbit vehicles have been successfully built and flown to orbit. The problem is the amount of fuel and oxidant required is approximately 97-98% of the total gross weight at launch. This leaves only 2-3% for the vehicle, the payload, and the engines.

Instead of single stage to orbit, multiple stages are used, with the first and second stages usually being expendable—i.e. they are tossed away after their fuel has been exhausted. Often a third stage is also expendable. The final part that gets to orbit is small, but better than 2-3%. Some companies are working on reusable early stages, but at present, most are used once and not able to be used a second time. Reusable stages reduce the cost and increase the safety. Being able to test a vehicle before its commercial flights allows the engineers to find any problems and correct them before the vehicle is exposed to its maximum stress.

Many companies have designed first stages to launch the rocket assembly, and then fly back to Earth. Usually they have wings and the winged first stage glides back to a landing strip. Some designs include extra air-breathing jet engines for the return flight, or sufficient fuel and oxidant and a rocket engine that can be run at lower thrust and can be used to power the return flight. This allows the first stage to be safely returned and reused afterwards. U.S. Pat. No. 6,612,522 proposes a reusable first stage booster that can fly back to the launch pad. Kistler Space Systems' U.S. Pat. Nos. 6,158,693 and 5,927,653 propose a parachute system for the safe return. Others such as SpaceEx and Blue Origins have designed first stage rockets that return and use their rocket engines to land vertically. Some have returned safely, but at present most vertical landing systems have failed to land properly and it remains difficult to have a first stage return this way. Airplane style vehicles are well proven and understood technology, and return of winged vehicles under power or gliding are common and generally very safe. If the first stage is essentially an airplane, then the return is a standard airplane return to the runway and landing.

If the first stage vehicle takes off vertically as described in U.S. Pat. No. 6,612,522, and then returns and lands on an airport runway, the setup and preparation of the launch requires all of the complex launch pad and services of a standard vertical ascending rocket. It reduces the required structure of the first stage compared to a runway takeoff, but it requires a launch pad and support structure. Usually the infrastructure to provide secure support before launch requires a system such as used for launches at the Kennedy Spaceport—which cost billions of dollars to build. If instead a first stage vehicle can take off from a standard airport runway, then the infrastructure is already available at many airports and the cost per flight is minimal. However, having an airplane-like vehicle for the first stage, or rocketplane, that can takeoff from a runway has some challenges. The rocketplane requires large amounts of weight for the fuel and oxidant in the vehicle at takeoff. To handle the takeoff weight, the wings need to be large, and the landing gear needs to be able to handle the weight. The entire structure of the vehicle needs to be stronger than if the fuel and oxidant was of minimal weight. At present, there are designs in process for such a rocket vehicle to act as a first stage, such as Xcor Aerospace's Lynx rocketplane, and U.S. patent application Ser. No. 11/408,164 but none have been actually built and are flying at present.

It would be desirable to have the first stage rocket powered airplane (rocketplane) be able to take off with little fuel and oxidant in the vehicle, and load the fuel and oxidant while in flight. This minimizes the vehicle structure, landing gear, and wing size. Such a reduction can save approximately 20% of the takeoff weight. As noted above, the payload can only be 2-3% of the total vehicle weight if the takeoff starts at sea level with all fuel and oxidant in the vehicle. Adding the fuel and oxidant in flight allows the payload and booster to be up to 20% of the total vehicle weight, allowing the payload to be significantly heavier than would be possible otherwise.

Several designs have tried to enable this concept by carrying the rocketplane on a larger airplane. For instance, Stratolaunch is designed to carry a fully loaded rocket or rocketplane to high altitude, of approximately 40,000 feet, and release the rocket or rocketplane at said altitude, and at a speed in the range of 500-1000 km/hour (300-600 mph) which is the normal cruising speed at 40,000 feet for a large jet airplane. This accomplishes the desired result of enabling the rocketplane to begin its flight at high altitude and with significant initial speed, but requires a very expensive dedicated vehicle to carry the rocket or rocketplane to altitude, and requires a complex and expensive procedure to connect the two vehicles before flight. Also, the rocketplane still requires significant structural strength since the vehicle is still carrying the full fuel and oxidant load at the start of the flight.

U.S. Pat. Nos. 5,295,642, 5,456,424, 5,564,648 and 6,119,985 have proposed transferring fuel and oxidant in flight. A larger tanker airplane carries the fuel and oxidant, and the rocketplane flies to altitude with its own power using jet engines or rocket engines, connects with the tanker's fuel and oxidant lines, and loads the fuel and oxidant in flight.

When the tanks are full, it separates from the tanker and uses its rocket engines to fly to a very high altitude where a payload and booster rocket are released to go to orbit. The rocketplane glides back to regular flight altitudes and then either glides back to an airport or uses its engines to fly back to an airport. This is accepted as a practical method to accomplish a low weight takeoff and high capacity of fuel and oxidant for the rocket powered portion of the flight. The challenge has been to prove the safety of the in-flight transfer of fuel and oxidant. The transfer of fuel in flight is a daily event with the air force, and is accepted as safe. However, the transfer of oxidant at the same time has not been demonstrated, and there are concerns about spillage of the oxidant getting into the jet engines and damaging them, or the spillage mixing with any fuel spillage and igniting, and of the difficulties of transferring cryogenic oxidant through standard hoses and connectors similar to those presently used for jet fuel.

The second problem of in-flight transfer of fuel and oxidant is that the rocketplane receiving the fuel and oxidant gains in weight as it flies. With the engines running at full power to maintain cruising speed, the added weight can only be compensated for by both the tanker and rocketplanes dropping in altitude during the transfer—estimated to be a drop from 40,000 feet to as low as 25,000 feet. This removes a significant part of the benefit of starting the rocket engines in rarefied atmosphere, which would allow the engines to be better tuned to minimal atmosphere which makes the engines more efficient.

U.S. patent application Ser. No. 14/708,197 discusses a design in which fuel and/or oxidant is transferred from an attached external tank to the rocket to ensure that the tanks are toped to full status before launch. But the rocket and its universal carry support system are designed to be independent of the carrier airplane and able to be attached to many models of airplanes. As such, the external tank is attached to the support system, which effectively is part of the rocket and is an expendable part of the rocket system, not part of the carrier airplane. It commences the flight with the rocket fully loaded and only uses the expendable external tank to top off the tanks. It does not allow the rocket to be carried with minimal fuel and/or oxidant.

U.S. Pat. Nos. 5,626,310 and 6,029,928 propose the concept of towing a rocketplane to a cruising altitude of 30,000-40,000 feet, with full fuel and oxidant tanks on takeoff. At cruising altitude the towing aircraft would release the towed rocketplane, and the towed rocketplane would start its rocket engines, and fly to very high altitude where it would release its payload and booster.

The problem with the tow concept is the potential danger on takeoff of an aborted takeoff. If the towing airplane needs to abort the takeoff, the towed rocketplane is directly behind it. The towed rocketplane is essentially a bomb, with both large amounts of fuel and oxidant on board. If the towed rocketplane should impact the towing airplane the potential for a devastating explosion is high. While aborts on takeoff are rare, the potential exists.

Another problem is that the towed rocketplane requires enough strength in the structure and landing gear to support the full weight of the fuel and oxidant. This minimizes the benefits of assisted launch from the towing airplane. In-flight fueling allows for a lighter structure since the takeoff weight does not include most of the fuel and oxidant. Kelly proposed having detachable wheels and supports for the takeoff that remained on the runway, but the vehicle structure still must be stronger, and therefore heavier, than a vehicle taking off with minimal fuel and oxidant.

BRIEF SUMMARY OF THE INVENTION

The presently disclosed systems and methods combine the advantages of in-flight fueling and towing and carrying systems while minimizing their disadvantages.

In the following discussion, the reference to rocket engine is intended to include any system that provides thrust in a rarified atmosphere. This includes rockets, scramjets, ramjets, plasma emitters, atomic thrust generators, and other such systems. It also includes multiple thrusters. In all cases, the intent is that the vehicle can ascend to very high altitudes with the propulsion of its engine(s), where the release of a small additional booster and payload will be able to deliver the payload to orbit. Also, the word payload is intended to include the case of one or multiple payloads—the number of payloads is not a determining factor. Their combined weight is the determining factor. Payload can also be considered to refer to anything delivered to orbit, including items such as cargo for the Space Station, satellites or people.

It is proposed to use a tow at the start of the flight to attain altitude and speed before starting the rocket engine of a rocketplane. However, instead of towing a rocketplane fully loaded with fuel and oxidant, it is proposed to carry the fuel and oxidant in the towing airplane. With nearly empty tanks, the towed rocketplane will require minimal structure for takeoff and landing. With a towed start, the rocketplane will not require extra engines such as jet engines to attain cruising altitude. This will reduce its weight, allowing for larger payloads. While in flight, the towing airplane can transfer the fuel and oxidant to the towed rocketplane. If the transfer lines are attached to the rocketplane while stationary on the ground before flight, the lines can be checked to be secure, and checked for leaks in the connections and the system ensured to be safe before the flight begins. There will be minimal chance of spillage during the fuel and oxidant transfer. It is expected that the tow line will be a structurally strong cable, and that the transfer lines will be independent of the tow cable and not stressed for the tow.

Should an abort on takeoff be required, the towed rocketplane has minimal fuel and oxidant on board, and is not a bomb, and is not explosive. Being much lighter than a fully fueled towed rocketplane, it is easier to stop if not yet in flight, or if already in flight, it is easier to control to land safely. Generally the towed aircraft will takeoff before the towing aircraft. An aborted flight after the rocketplane is in flight would require releasing the tow cable and reactant lines, and then the rocketplane will safely glide back to the runway. Being light but having wings large enough to support it in flight when fully fueled, it will glide well.

If the towed rocketplane is attached to the towing airplane during the transfer of fuel and oxidant, then the total weight being supported by the towing airplane does not change during the transfer. This allows the two vehicles to remain in level flight during the transfer, avoiding the loss of altitude necessary with in-flight transfer for a non-towed system. Higher starting altitudes increase the rocket engine's efficiency at the beginning of the rocket powered flight.

Fuel transfer is generally performed at medium airspeeds—such as 400 km/hour—to minimize turbulence and wind forces on the transfer lines. After the fuel is transferred, the towing airplane should be able to increase its speed and therefore the towed rocketplane's speed, so that at separation the two vehicles are traveling at the towing airplane's near maximum speed, adding additional velocity to the rocketplane at separation, increasing its final velocity or payload.

Additionally, if the cables can be released easily, the towed rocketplane may be able to start its engines while still being towed, avoiding the need for the rocketplane to drop for a while after separation from the carrier or tow airplane before the engine starts. At present in-flight release of carried rockets and rocketplanes start the rocket while aiming horizontal or down. Essentially the carrier aircraft drops the rocket or rocketplane and only after being dropped are the rocket engines are started. Starting the engines while attached to the carrier is considered too dangerous. So the dropped rocket or rocketplane necessarily has its nose aiming down until the rocket engine has acquired sufficient thrust to start increasing the rocket or rocketplane's speed and bring the nose up and aim to higher altitudes. Energy is wasted in gaining speed and aiming the vehicle up to necessary attitude to go up to its desired final altitude for releasing the payload and booster. Even a few percent advantage is significant when the payload is limited to a small part of the total weight.

It is apparent that the landing gear and wings may not be necessary after the rocket engine is started. Most rockets launched from the surface of the Earth are essentially long tubes with a pointed nose and only tail fins for steering. The wings and landing gear are necessary for takeoff and flight and to maintain flight while transferring fuel and oxidant. After that, the wings and landing gear can be separated from the portion that goes to high altitude. This has been detailed in Palmer's U.S. Pat. No. 5,564,648. Such a separation is not necessary, but it is possibly an additional benefit for minimizing the weight carried to high altitude. The rocket part of the vehicle can be returned with parachutes, which are lighter than wings and landing gear. This minimizes the weight, but increases the probability of damage to the rocket on landing with parachutes, and increases the preparation process for flight and the number of things that can go wrong. For frequent flights, routine maintenance, and simplest operations the final vehicle boosting the payload and booster to high altitude should be the complete vehicle with wings and landing gear. But for delivery of maximum payload to orbit, a rocket that separates from the wings and landing gear may be useful. Kelly's system of leaving the heavy support and wheels on the runway during takeoff still leaves the wings on the vehicle for the full flight. Dropping the wheels and wings when the vehicle begins its rocket powered flight minimizes the weight to very high altitude, and allows the wings and landing gear to glide back to the runway intact as essentially a separate vehicle. How the final vehicle is configured to fly to very high altitude is not relevant to this patent. Many configurations will all benefit from an initial tow and from a tow while loading fuel and/or oxidant.

It is apparent that the towed rocketplane may be of any design that allows it to fly controllably while being towed and while self-powered with its rocket engines. Wings are likely to be used, but are not necessary. The drawings show one potential configuration, but any vehicle able to fly while being towed is appropriate.

If the rocketplane is desired to land with power, it is necessary for the rocketplane to have either a rocket engine that can be run at variable speeds, allowing it to power the return flight to the airport and maintain control during landing, or the rocketplane will need jet engines to provide power during landing. If jet engines are added to the rocketplane, the rocketplane will have a higher dry weight, and a smaller payload to orbit. However, it also allows the rocketplane to takeoff with minimal fuel still enabling the minimal structural weight on takeoff, while avoiding the need for a tow to takeoff Logistically it is slightly easier to have two independent vehicles take off. However, to avoid the loss of altitude during fueling from the tanker, the rocketplane should first attach a tow cable to the tanker while in flight. Once attached to the tow cable, the fuel and oxidant lines could be attached, and the fuel and oxidant transfer be carried out without the towed rocketplane losing altitude. This is a lessor advantage than the tow from takeoff, but a better system than the inflight fueling without a tow cable attached.

It is also apparent that the main benefit of this disclosure is the concept of both starting flight with minimal fuel and/or oxidant on board the rocket or rocketplane, and transferring the fuel and/or oxidant while in flight and while both vehicles are securely attached so that the tanker airplane provides lift and velocity to the rocket or rocketplane. As such, it is also apparently equally beneficial for rockets and rocketplanes carried on airplanes, rather than being towed, to be carried with minimal fuel and/or oxidant on takeoff and to transfer the fuel and/or oxidant while in flight. When the carried rocket or rocketplane is fully fueled, it creates a significant balancing problem and structural support problem. If the carried vehicle is minimally loaded with fuel and oxidant, then the structural supports and balance considerations are minimalized, allowing for safer flight and lighter structures. If the carrier aircraft has tanks inside the main fuselage for the rocket vehicle's fuel and oxidant, the load of the fuel and oxidant will be secured in the standard structure of the airplane, and minimal extra support will need to be added to enable the carrier airplane to support the rocket or rocketplane. Once in flight, the rocketplane will have extra lift from its own lifting surfaces, so adding the fuel and/or oxidant will continue to have minimal stress on the carrier airplane, and its support structure will remain safe without having to bear the full load of the fully fueled rocketplane. To date, several rockets and rocketplanes have been carried to altitude before starting the rockets. Virgin Galactic use a twin hulled carrier airplane to carry their rocketplane to altitude, but it is fully loaded with fuel and oxidant before the carrier begins its flight. Orbital Sciences use a carrier airplane to launch their Pegasus rocket, but with a solid fuel engine, it must be fully loaded before flight starts. Generally carried rockets and rocketplanes require very large airplanes relative to the rocket such as with the tiny Pegasus rockets, or special twin hulled carrier aircraft to enable the rocketplane's added weight to be balanced enough for a safe flight. Adding a light weight rocketplane with no fuel or oxidant to a large carrier airplane is not changing the center of gravity much, so the airplane can still fly safely with minimal modification.

BRIEF DESCRIPTION OF THE SEVERAL VIEWS OF THE DRAWINGS

Other features and advantages of the present invention will be apparent from the following detailed description of the invention, taken in conjunction with the accompanying drawings of which:

FIG. 1 depicts a first embodiment of a rocketplane towed by a larger towing airplane;

FIG. 2 is a side section view of the towing airplane and rocketplane of FIG. 1 with fuel and oxidant tanks in the towing airplane and the transfer lines to the rocketplane;

FIG. 3 is an elevation view of a second embodiment of a rocketplane carried atop a carrying airplane;

FIG. 4 is a side section view of the rocketplane and carrying airplane with fuel and oxidant tanks in the carrying airplane and transfer lines to the rocketplane.

DETAILED DESCRIPTION OF THE INVENTION

Figure 5:
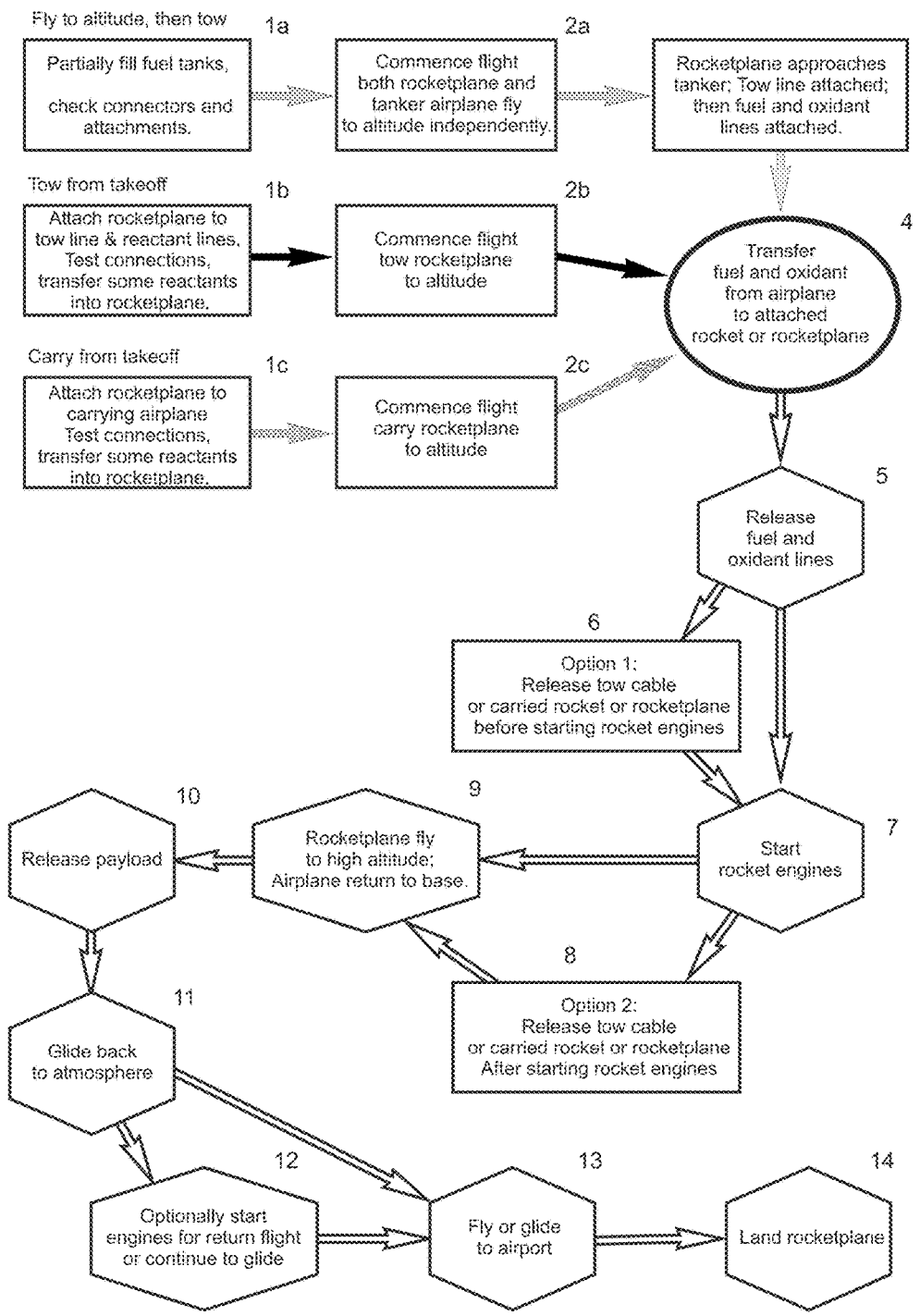
FIG. 5 is a flow chart showing processes according to the present disclosure.

FIG. 1 shows a first embodiment of a towing system according to the present disclosure. A rocketplane 1, otherwise referred to herein as a high altitude vehicle, is attached to a towing airplane 2 with a tow line or cable 3 strong enough to enabling the pulling of the rocketplane without breaking. An oxidant transfer line 4 and a fuel transfer line 5 are attached between the rocketplane and the towing airplane but are not supporting or towing the rocketplane, and may be separately attached between the rocketplane and the towing airplane, or may be secured to each other or to the tow line. The transfer of fuel and/or oxidant between the towing airplane and rocketplane occurs while they are securely attached and in flight. How and when the tow line is attached is not critical to the process. The cable may be attached before takeoff, and the towing airplane tows the rocketplane from the beginning of flight, or it may be attached while in flight, in which case the towing airplane only tows the rocketplane during fuel and/or oxidant transfer. There are advantages in both approaches. In both cases, the tow cable and transfer lines must be detachable when required. The attachment and detachment process is not a critical design factor—it will be possible to accomplish this in many ways known to those skilled in the art of connecting and releasing cables and transfer lines. The style of rocketplane is not critical to the process, and the towing aircraft can be any airplane able to support the weight and drag of the towed rocketplane.

FIG. 2 shows a cross section of the towing airplane 2 and the towed rocketplane 1. The rocketplane is attached to the towing airplane with a strong enough cable 3 able to pull the rocketplane without breaking. The oxidant transfer line 4 and the fuel transfer line 5 are attached but do not support the rocketplane. The fuel tank 7 and the oxidant tank 9 in the towing airplane are full at takeoff, and the fuel tank 8 and oxidant tank 10 in the towed rocketplane are empty or almost empty on takeoff. It is necessary to cool the rocketplane oxidant tank before transfer of the main load while in flight. The oxidant is generally very cold. For example liquid oxygen is −183 degrees centigrade or colder. If cold oxidant is delivered to a warm tank, it boils rapidly and the gas must be vented. It is common to add some liquid oxygen to the oxidant tank before the flight begins, to cool the tank so that when the oxidant is transferred there is minimal boiling off of the oxidant. The amount is not critical as long as there is enough to keep the tank cool until the main load is transferred in flight. The transfer lines are connected to the rocketplane 1 with detachable connectors 6 that allow the pilot or crew of the towing airplane, the pilot or crew of the rocketplane, or ground-based controllers to detach the connectors easily when the tanks are full or if there is any emergency in which separating the two vehicles is desired. Such connectors are commonly used for transferring fuel and oxidant to regular vertical takeoff, expendable rockets. Any rocket using liquid oxygen will have liquid oxygen being sent to the rocket's oxygen tanks until the last minute before takeoff to minimize losses from boiling off. Quick releases are standard on all such rockets. When the towing airplane has reached the desired launch altitude, the fuel and oxidant are transferred to the rocketplane's tanks. The rocketplane has a rocket engine or engines 11 which receive the fuel and oxidant from the rocketplane's fuel tank 8 and oxidant tank 10 when the rocket engine(s) are started.

FIG. 3 shows a large airplane 200 carrying a rocketplane according to a second embodiment of the present disclosure. In this figure, the rocketplane 100 is on the back of a carrying airplane 200 such as a Boeing 747. The rocketplane may be mounted anywhere convenient as long as it allows the carrying aircraft to fly safely. For example, the rocketplane may be mounted on top, on the belly, on a wing or under a wing of the carrying plane. The size of the rocketplane will be a major determining factor in its placement. In all variations of placement, having the fuel and oxidant tanks empty in the rocketplane prior to launch preparation allows simpler mounting and carrying of the rocketplane with minimal change in the center of gravity for the carrying airplane.

FIG. 4 shows a cross section of the carrying airplane 200 and the carried rocketplane 100. The rocketplane 100 is attached to the carrying airplane 200 with supports 300 able to carry the rocketplane safely and to release the rocketplane when desired. The fuel transfer line 400 and the oxidant transfer line 500 are attached but not supporting the rocketplane. The fuel tank 700 and oxidant tank 900 in the towing airplane are full at takeoff, and the fuel tank 800 and oxidant tank 1000 are almost empty on takeoff. Some oxidant is desired to be in the oxidant tank as mentioned above. The transfer lines are connected to the rocketplane 100 with detachable connectors 600 that allow the pilot or crew of the carrying airplane, the pilot or crew of the rocketplane, or ground controllers to detach the connectors easily when the tanks are full or if there is any emergency in which separating the two vehicles is desired. When the carrying airplane has reached the desired launch altitude, the fuel and oxidant are transferred to the rocketplane's tanks. The rocketplane has a rocket engine or engines 1100 which receive the fuel and oxidant from the rocketplane's fuel tank 800 and oxidant tank 1000 when the rocket engine(s) are started.

FIG. 5 shows a flow chart of the presently disclosed processes. There are three starting paths, listed as 1a (Fly to altitude and then tow), 1b (Tow from takeoff) and 1c (Carry from takeoff). The fly to altitude and then tow 1a allows both vehicles to commence flight under their own power and fly to altitude. This allows minimal assembly on the ground, and allows both vehicles to takeoff 2a from standard runways using standard flight rules and procedures. When they achieve the desired altitude, the rocketplane is attached with a tow cable first, then the fuel and oxidant lines are attached 3 and then the fuel and oxidant are transferred from the towing airplane to the rocketplane. Without a towing connection, the rocketplane gains weight rapidly and will typically require that the towing airplane and rocketplane lose altitude to maintain speed. In such a transfer process, they will typically drop from 40,000 feet altitude to 25,000 feet or lower. Although the rocketplane will have full tanks, it will require a significant amount of fuel and oxidant to accelerate to speed and re-attain the original transfer altitude. If as proposed in this disclosure the two are attached via a tow cable, the towing airplane will be able to compensate for the rocketplane's increased weight as it loads fuel and oxidant, so that there is no loss of altitude during the transfer.

Option 1b shows the process of starting the flight with the towing airplane already attached to the rocketplane and towing the rocketplane to altitude 2b. With a rocketplane having minimal fuel and oxidant in its tanks, it will be very light relative to its wing's lift and will take off before the towing airplane. This allows for a safe abort on takeoff since the rocketplane will be in flight first and able to maneuver away from the towing airplane easily if necessary. In comparison to prior art of towing a rocketplane fully loaded with reactant, the fully loaded rocketplane will be much less maneuverable and less able to move away from the towing airplane even if it does take off first. In many instances a fully fueled rocketplane will take off after the towing airplane, and be impossible to manoeuver at all if there is an abort on takeoff. Also, this approach allows the transfer lines to be attached and checked while the vehicles are still on the ground. This ensures that the lines are secure and will not leak.

Option 1c is the present common way of getting a rocket vehicle to higher latitude before launch in which the rocket or rocketplane is carried on a larger airplane to altitude 2c. This has the same advantages of a tow from takeoff 1b in that the transfer lines can be attached and checked to be secure before the airplane takes off. But it requires equipment to lift and place the rocket or rocketplane on the carrying airplane. This minimizes the number of locations where the process can be operated to those with such facilities. The systems according to the presently known art use rockets with full tanks or solid fuel. This adds significant weight to the rocket or rocketplane, and requires a carrying airplane that is either very much larger than the rocket or rocketplane, or is specially built such as the twin hulled carrier airplane for Virgin Galactic's design or Vulcan Aerospace's Stratolaunch. If the rocket or rocketplane have empty tanks, it weighs significantly less and has minimal effect on the carrying airplane's stability and balance. It is also easier to mount on the carrying airplane due to its lighter weight, and is safer due to the fuel and oxidant tanks of the rocket or rocketplane not being filled with explosive reactants.

For all three paths, they arrive at process step 4 in which the rocket or rocketplane is attached to the towing or carrying airplane, and the fuel and oxidant are transferred safely to the rocket or rocketplane. This is a critical part of the process—transferring fuel and oxidant safely while in flight at a high altitude and without losing altitude to maintain speed during the process. As described previously, fuel transfer is generally performed at medium airspeeds—such as 400 km/hour—to minimize turbulence and wind forces on the transfer lines. After the fuel is transferred, the towing or carrying airplane should be able to increase its speed and therefore the towed or carried rocketplane's speed, so that at separation the two vehicles are traveling at the towing airplane's near maximum speed, adding additional velocity to the rocketplane at separation, increasing its final velocity or payload.

Process step 5 is to release the fuel and oxidant transfer lines, which is common to all three processes. Step 6 is one of the release options in which the rocket or rocketplane is released from the tow cable or carrier support before the rocket engine(s) is started. Carried rockets or rocketplanes will usually be released before the rocket engine is started, but starting the engines first may be technically desirable in some designs. Step 7 is to start the rocket engine(s). Step 8 is the second release option in which the rocket engine(s) is started first and then the tow cable or carry supports are released. Releasing the tow cable or carry supports first is safer, but the rocketplane will lose speed and altitude as it separates from the towing airplane until its rocket engines have enough thrust to power its flight. Releasing the tow cable or carry supports after the rocket engine(s) are started allows the rocket or rocketplane to be flying under its own power before separation, so there is no loss of speed or altitude between being towed or carried and being in flight under its own power.

Process steps 9 to 14 remain the same regardless of how the rocket or rocketplane is attached to the towing or carrying airplane. In all cases the rocket or rocketplane flies to high altitude 9, releases the payload 10, coasts or glides back to the lower atmosphere 11, optionally start engines for atmospheric flight 12, and then glides, or flies under power from of its engines, to the airport where it plans to land 13 and land 14.

The rocketplane as described in the foregoing may include a crew of one or more persons who may be in control of the operation of the rocketplane. The rocketplane may also be provided with on-board guidance and control systems for partial or completely automated flight management, with or without on-board personnel. Further still, the rocketplane operation may be controlled via controller personnel, located on the ground, in the tow plane, or elsewhere, via known communication systems. The latter personnel may also control the rocketplane in conjunction with on-board guidance and control systems.

Many changes in the details, materials, and arrangement of parts and steps, herein described and illustrated, can be made by those skilled in the art in light of teachings contained hereinabove. Accordingly, it will be understood that the following claims are not to be limited to the embodiments disclosed herein and can include practices other than those specifically described, and are to be interpreted as broadly as allowed under the law.

What is claimed is:

1. A process of launching a high altitude vehicle designed to fly to high altitudes above 100,000 feet comprising the steps of:

connecting a tow cable and fuel and oxidant transfer lines between a towing airplane and the high altitude vehicle for towing the high altitude vehicle, with respective engine(s) unstarted, behind the towing airplane from takeoff and for an initial portion of a flight, the towing airplane carrying fuel and oxidant for transfer to the high altitude vehicle, the high altitude vehicle having a fuel tank and an oxidant tank and having less than 10% fuel and oxidant in the respective tank from takeoff and for the initial portion of the flight;

transferring fuel and oxidant from the towing airplane to the high altitude vehicle via the fuel and oxidant transfer lines at a desired altitude above 25,000 feet and at a desired flight speed sufficient to enable the lift of the high altitude vehicle to support the vehicle, transferred fuel, and transferred oxidant;

disconnecting the tow cable and fuel and oxidant transfer lines from the high altitude vehicle; and commencing the powered flight of the high altitude vehicle substantially at the desired altitude and at the desired flight speed, wherein the high altitude vehicle commences flight from takeoff with a minimal amount of fuel and oxidant and with a concomitant lower weight and, after transfer of the fuel and oxidant from the towing airplane to the high altitude vehicle, the high altitude vehicle commences self-powered flight with maximum fuel and oxidant while substantially at the desired altitude and flight speed, enabling it to achieve a higher altitude and speed than would be possible commencing self-powered flight with fully loaded fuel and oxidant tanks from takeoff.

2. The process of claim 1, wherein the high altitude vehicle is configured to fly to the ground and for re-use at least one additional cycle of the connecting, transferring, disconnecting, and commencing steps.

3. The process of claim 1, wherein the high altitude vehicle is self powered with one or more of an engine selected from the group consisting of a jet engine, rocket engine, scramjet engine, ramjet engine, plasma engine, and hybrid air breathing rocket engine.

4. The process of claim 1, wherein the high altitude vehicle is a drone either remotely operated or self-controlled via on-board guidance and control systems.

5. The process of claim 1, wherein the high altitude vehicle is under the control of an on-board person acting as a pilot to control the high altitude vehicle.

6. A process of launching a high altitude vehicle comprising the steps of:

mechanically and fluidly connecting the high altitude vehicle to a support aircraft, whereby the support aircraft is configured for carrying the high altitude vehicle, with respective engine(s) unstarted, during takeoff and for an initial portion of a flight, the support aircraft carrying fuel and oxidant for use by the high altitude vehicle, the high altitude vehicle having fuel and oxidant tanks and having less than 10% fuel and oxidant in the respective tank at the commencement of the flight, from the ground to the desired altitude, transferring fuel and oxidant from the support aircraft to the high altitude vehicle while in flight at a desired altitude above 25,000 feet and at a desired flight speed sufficient to enable the lift of the high altitude vehicle to support the vehicle, transferred fuel, and transferred oxidant, and mechanically and fluidly disconnecting the high altitude vehicle from the support aircraft substantially at the desired altitude and at the desired flight speed; and commencing self-powered flight of the high altitude vehicle substantially at the desired altitude and substantially at the desired flight speed of the support aircraft from which the high altitude vehicle was released, whereby the high altitude vehicle achieves a higher altitude and flight speed than would be possible commencing self-powered flight with fully loaded fuel and oxidant tanks from the commencement of the flight.

7. The process of claim 6, wherein the high altitude vehicle is configured to fly to the ground and for re-use at least one additional cycle of the mechanically and fluidly connecting, transferring, mechanically and fluidly disconnecting, and commencing steps.

8. The process of claim 6, wherein the high altitude vehicle is self powered with one or more of an engine selected from the group consisting of a jet engine, rocket engine, scramjet engine, ramjet engine, plasma engine, and hybrid air breathing rocket engine.

9. The process of claim 6, wherein the high altitude vehicle is a drone either remotely operated or self-controlled via on-board guidance and control systems.

10. The process of claim 6, wherein the high altitude vehicle is under the control of an on-board person acting as a pilot to control the high altitude vehicle.

\* \* \* \* \*